(12) United States Patent
Bunker

(10) Patent No.: US 7,078,652 B2
(45) Date of Patent: Jul. 18, 2006

(54) METHOD AND APPARATUS FOR WELDING WITH HIGH FREQUENCY PROTECTION

(75) Inventor: Thomas A. Bunker, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 169 days.

(21) Appl. No.: 10/428,391

(22) Filed: May 2, 2003

(65) Prior Publication Data

US 2004/0217097 A1 Nov. 4, 2004

(51) Int. Cl.
*B23K 9/10* (2006.01)
(52) U.S. Cl. .................................................. 219/130.1
(58) Field of Classification Search ............. 219/130.1, 219/130.21, 130.31, 130.32, 130.33, 130.51; 333/177, 181; 363/89
See application file for complete search history.

(56) References Cited

U.S. PATENT DOCUMENTS

| 3,683,271 | A | * | 8/1972 | Kobayashi | 333/177 |
| 4,117,303 | A | * | 9/1978 | Hedberg | 219/130.1 |
| 4,683,529 | A | * | 7/1987 | Bucher, II | 363/89 |
| 4,777,455 | A | * | 10/1988 | Sakamoto et al. | 333/181 |
| 6,037,566 | A | * | 3/2000 | Yasuhara et al. | 219/130.1 |
| 6,087,626 | A | | 7/2000 | Hutchison et al. | |
| 6,091,612 | A | * | 7/2000 | Blankenship | 363/45 |
| 6,329,636 | B1 | | 12/2001 | Geissler | |

OTHER PUBLICATIONS

Schindler, "Proper layout and component selection control power-supply EMI", Oct. 2000, EDN magazine, pp. 137-153.*

* cited by examiner

*Primary Examiner*—Clifford C. Shaw
(74) *Attorney, Agent, or Firm*—George R. Corrigan

(57) ABSTRACT

A method and apparatus for providing welding-type power is disclosed. The power supply has two output lines, and two inductances that are magnetically coupled, or a common mode inductance, in the output lines. The inductances may be installed when the power supply is built, or added afterwards. The inductance may protect the welding-type power supply from high frequency noise on a workpiece.

20 Claims, 2 Drawing Sheets

METHOD AND APPARATUS FOR WELDING WITH HIGH FREQUENCY PROTECTION

FIELD OF THE INVENTION

The present invention relates generally to the art of welding-type power supplies. More specifically, it relates to welding-type power supplies that have protection from high frequency noise.

BACKGROUND OF THE INVENTION

Welding-type power supplies have become more sophisticated in recent years, including using digital communications, and having elaborate control schemes which are often at least partially digital. Welding-type power supplies with digital communication and control are particularly susceptible to EMI, which can more easily cause damage to the control and communication components. Welding-type power supply, as used herein, includes welding, heating or cutting power supplies.

Some prior art systems used a common mode inductance on the primary input lines, to block common mode noise. However, such prior art welding-type power supplies did not provide for protection from high frequency on the output studs. Indeed, there has not been a recognition in the prior art of the danger of noise coming back through the output cables, into the power supply.

EMI filtering typically includes shunting unwanted noise currents to the machine chassis or housing (by capacitors). However, this requires a low impedance between all sheet metal interfaces, or large voltages can develop which push unwanted noise currents into the signal lines. Such prior art EMI protection was adequate for welding-type power supplies that were not as sensitive as current systems with digital (or sensitive analog) components.

Unfortunately, prior art EMI protection is often not sufficient for modern systems, which can particularly fail from noise that enters the system from the output studs. Noise that can damage a welding-type power supply is often high frequency, such as in 2 to 20 MHz, or even in the hundreds of MHz range.

Accordingly, a welding-type power supply that is effectively protected from EMI or noise, particularly noise that is high frequency, such as 2 to 20 MHz, is desired.

SUMMARY OF THE PRESENT INVENTION

According to a first aspect of the invention a welding-type power supply has two output lines. Inductances that are magnetically coupled are in the output lines.

According to a second aspect of the invention a welding-type power supply has two output lines that include a common mode inductance.

According to a third aspect of the invention a welding-type power supply has an output with an inductance that protects the welding-type power supply from high frequency noise on a workpiece.

According to a fourth aspect of the invention a high frequency protector for a welding-type power supply includes two inductances that are connectable to the output lines. The inductances are magnetically coupled. They may be mounted inside or outside the housing, and/or connected to the output studs and/or welding cables.

According to a fifth aspect of the invention a high frequency protector for a welding-type power supply includes a common mode inductance that is connectable to the output lines. They may be mounted inside or outside the housing, and/or connected to the output studs and/or welding cables.

The two inductances are wound about a common core in one embodiment.

The two inductances have equal differential mode magnitudes, and are at most 30, 1 or 0.5 microhenrys, in various embodiments.

The two inductances have a common mode inductance of at least 30, or 60 microhenrys, or at least 30 or 100 times the differential mode inductance, in various embodiments.

Input inductances that are magnetically coupled are provided on input power lines in another embodiment. They may have the same differential inductance.

The inductances protect the welding-type power supply from high frequency noise on a workpiece in another embodiment.

A capacitance is connected from the inductances to ground in one embodiment.

Other principal features and advantages of the invention will become apparent to those skilled in the art upon review of the following drawings, the detailed description and the appended claims.

Figure 1:
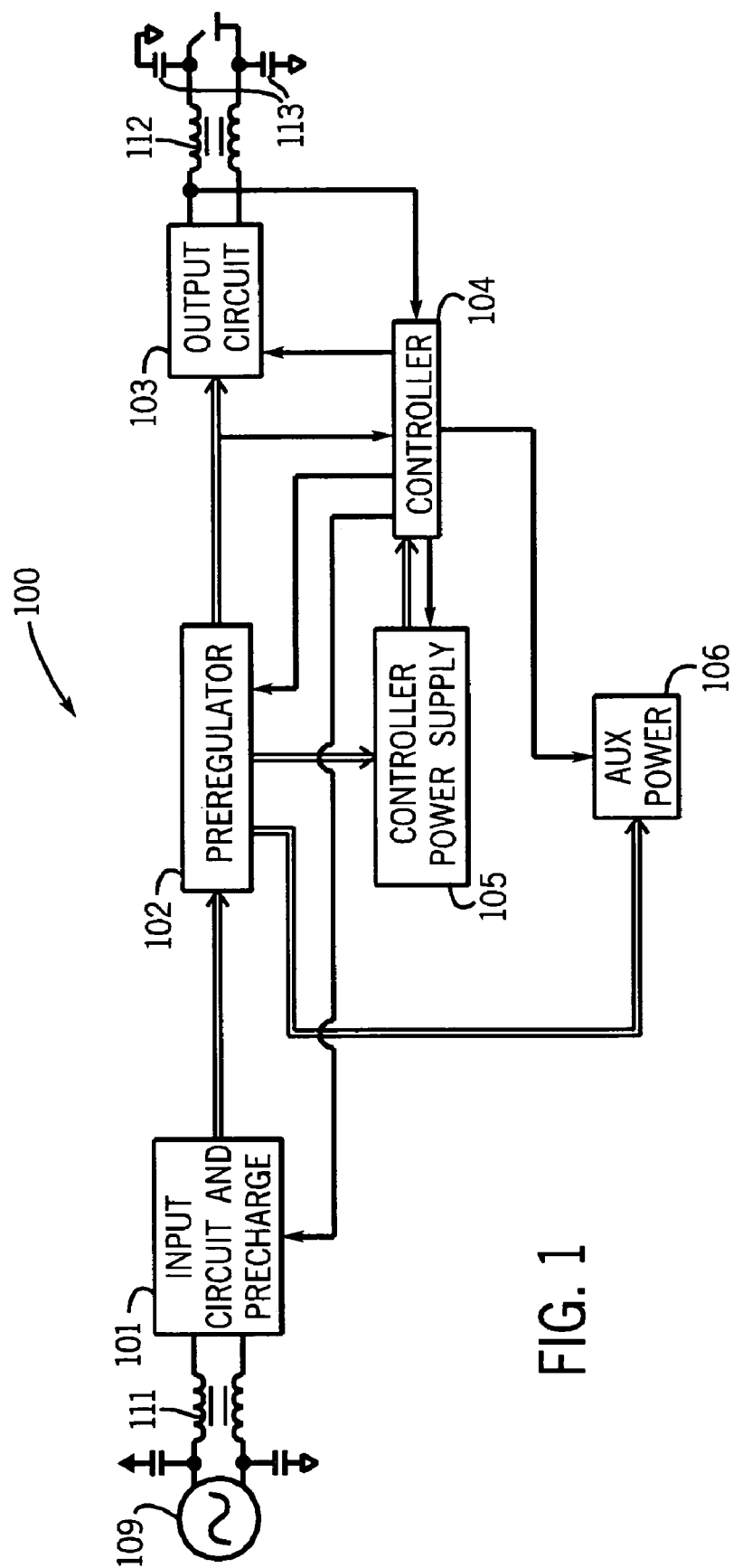
FIG. 1 is a block diagram of a welding-type power supply in accordance with the present invention.

Before explaining at least one embodiment of the invention in detail it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting. Like reference numerals are used to indicate like components.

DETAILED DESCRIPTION OF THE PREFERRED EMBODIMENTS

While the present invention will be illustrated with reference to particular components it should be understood at the outset that the welding-type power supply and noise protection described herein may also be implemented with other components.

Generally, the present invention provides a way to eliminate or reduce EMI using high impedance to the noise signal at some or all inputs and/or outputs. The most challenging input/output lines are the primary power leads and the output welding leads, which can carry hundreds of amps. Specifically, in accordance with the preferred embodiment inductances are provided before or after bypass capacitors on the output lines. The inductance are preferably a common mode inductor, which is designed to have a large impedance at frequencies common to EMI in the welding environment, such as from two to twenty megahertz, with lesser frequency components well into the hundreds of megahertz range.

The preferred embodiment is implemented on a welding-type power supply using a topology such as that described in U.S. Pat. No. 6,329,636, issued Dec. 11, 2001, entitled Method And Apparatus For Receiving A Universal Input Voltage In A Welding Plasma Or Heating Power Source, and a control scheme such as that shown in U.S. Pat. No. 6,087,626, issued Jul. 11, 2000, entitled Method And Apparatus For Welding, both of which are hereby incorporated by reference. However the particular topology and control is not important to the invention. Indeed, one embodiment provides for an after market kit which may be attached to any existing welding-type power supply.

Referring now to FIG. 1, a welding power source 100 includes an input circuit 101, a preregulator 102, an output circuit 103, a controller 104, a controller power supply 105, an aux power supply 106, an input high frequency blocking inductance 111, an output high frequency blocking inductance 112, and an output bypass capacitor 113.

Input circuit 101 receives input utility or generator power, and provides a signal to preregulator 102. The input is ac, and the input circuit includes a rectifier and capacitor bank in the preferred embodiment. Preregulator 102 receives the signal from input circuit 101 and provides preregulated signal. Preregulator 102 includes a boost converter and boosts the rectified signal to be a dc bus (about 1000Vdc) in the preferred embodiment. Preregulator 102 includes other types of converters, such as an inverter, a series resonant converter, etc., in other embodiments. Output circuit 103 receives the dc bus and provides an output suitable for welding/heating/cutting. Output circuit 103 includes, in the preferred embodiment, an inverter, followed by a transformer, followed by a rectifier and an output inductor. An ac output is provided in one embodiment. The output power is also frequency and voltage independent of the dc bus and the input signal. Output circuit 103 is comprised of other components in other embodiments, and may provide an ac or dc output. Controller 104 causes the boost and inverter switches to switch in response to feedback and a setpoint (such as 1000V for the boost converter and a user setpoint for the output inverter). Control power is provided to the controller by controller power supply 105. Controller power supply 105 derives power from the output of preregulator 102, in the preferred embodiment.

The circuitry that controls preregulator 102, output circuit 103 and controller power supply 105 is collectively called controller 104 because of the common function (controlling). However, in practice they may form distinct and remotely located circuits, they may share circuitry, they may reside in a common microprocessor or DSP, and they may share control signals and feedback.

In accordance with the present invention a common mode inductor 112 includes inductances on both output lines. The inductances share a common core. The inductances are effective as an EMI filter if they do not saturate during normal operation. A common mode choke (inductances) cancels out large DC bias currents if both conductors, carrying a given load current, pass through the choke in the same direction. Noise currents enter the welding machine as on all conductors in an equal amount. This is referred to as common mode noise. A common mode choke blocks the common mode noise currents while allowing the differential signal to pass unimpeded. A typical common mode choke will present impedance of hundreds of ohms to the common mode noise while inserting only a few ohms to the differential signal.

Figure 2:
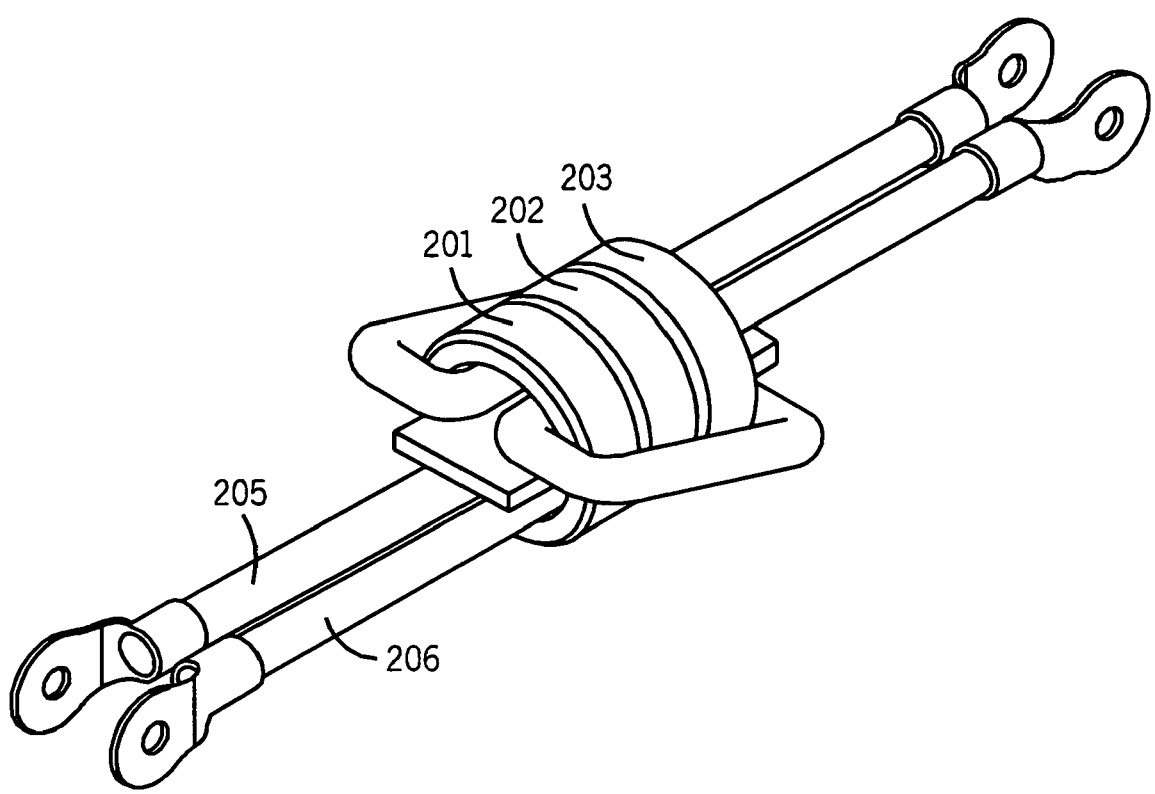
FIG. 2 is an output inductance in accordance with the present invention.

Output choke or inductances 112 is shown in detail in FIG. 2 and includes three J type ferrite toroids 201–203 with two turns of each weld cable 205 and 206 through them. Cables 205 and 206 are connected at one end to output circuit 103, and to the output studs of power supply 100 at the other end. The turns are placed in such a way that the flux produced by the weld current cancels each other. The output common mode choke has a 66 uH common mode inductance and a 0.42 uH differential inductance. The differential inductance has no effect on the welding current waveform. The common mode inductance has minimum impedance of 820 ohms at 2 MHz. Other embodiments provide for a common mode inductance of at least 60 microHenrys, or at least 30 microHenrys, and a differential mode inductance of no more than 0.5 microHenrys, or no more than 1 microHenry, or for a ration of common mode inductance to differential mode inductance of at least 30:1, or 100:1.

A common mode choke 111 (FIG. 1) is also provided on the input lines in the preferred embodiment (all though it is omitted in other embodiments). Input inductances 111 are placed in the two input lines and comprise a tube with six J type ferrite toroids, in the preferred embodiment. These toroids have a 36 uH common mode inductance and negligible differential inductance. The 36 uH common mode inductance has minimum impedance of 450 ohms at 2 MHz.

Common mode chokes 111 and 112 are followed by a 0.027 uF bypass capacitor. The bypass capacitor has an impedance of 6 ohms at 2 MHz. This combination reduces the noise at 2 MHz by 76 (−38 db) at the input power lines and by 138 (−43 db) at the output welding cables. Other frequencies are also attenuated in a similar fashion.

The chokes are mounted inside the chassis or housing in the preferred embodiment. In an alternative embodiment the chokes are mounted outside the housing. For example, they can be mounted inside a small housing, with cable to connect to the output studs of a welding power supply, and have their own output studs, to which the weld cable are connected. In this fashion they can be sold as a kit to protect existing welding-type power supplies.

Another embodiment provides for the typical output choke (inductance) found in welding-type power supplies to be incorporated into the high frequency protection inductances. In this embodiment the differential mode inductances are the typical output inductance for prior art welding-type power supplies, such as 10, 20, 30, 60 or more microhenrys. The common mode inductance may be commensurately higher, or at the same level as in the other embodiments.

Thus, it may be seen that the invention described herein provides for blocking high frequency, and protect the welding-type power supply from high frequency noise from the workpiece. High frequency, as used herein, refers to frequencies at least in the tens of KHz. Protect the welding-type power supply from high frequency noise from the workpiece as used herein, refers to blocking sufficient high frequency noise to avoid damaging the power supply.

Numerous modifications may be made to the present invention which still fall within the intended scope hereof. Thus, it should be apparent that there has been provided in accordance with the present invention a method and apparatus for welding with high frequency protection that fully satisfies the objectives and advantages set forth above. Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

What is claimed is:

1. A welding-type power supply having an output current through first and second output lines, wherein the first output line includes a first inductance and the second output line includes a second inductance, and further wherein the first inductance and the second inductance are magnetically coupled wherein a first flux from the output current through the first inductance tends to cancel a second flux from the output current through the second inductance, and further wherein the magnitude of the inductance for current that sums to zero through the first and second output lines is at most 1 microhenry and the magnitude of the inductance for current that does not sum to zero through the first and second cables has a magnitude of at least 30 microhenrys.

2. The welding-type power supply of claim 1, wherein the first inductance and the second inductance protect the welding-type power supply from high frequency noise on a workpiece.

3. The welding-type power supply of claim 1, further comprising at least first and second input power lines, wherein the first input line includes a third inductance and the second input line includes a fourth inductance, and further wherein the third inductance and the fourth inductance are magnetically coupled.

4. The welding-type power supply of claim 3 wherein the third inductance has a second magnitude and the fourth inductance has the second magnitude.

5. The welding-type power supply of claim 4, further comprising capacitances connecting the first and second output lines to ground, wherein the first and second inductances and the capacitances protect the welding-type power supply from high frequency noise on a workpiece.

6. The welding-type power supply of claim 4, wherein the first and second inductances have a common mode inductance of at least 30 times the differential mode magnitude.

7. The welding-type power supply of claim 1, further comprising at least first and second input power lines, wherein the first input line includes a third inductance and the second input line includes a fourth inductance, and further wherein the third inductance and the fourth inductance are magnetically coupled.

8. The welding-type power supply of claim 7, wherein the third inductance and the fourth inductance protect the welding-type power supply from high frequency noise on an input.

9. The welding-type power supply of claim 1, further comprising capacitances connecting the first and second output lines to ground, wherein the first and second inductances and the capacitances protect the welding-type power supply from high frequency noise on a workpiece.

10. The welding-type power supply of claim 1, wherein the first inductance and the second inductance protect the welding-type power supply from high frequency noise on a workpiece.

11. The welding-type power supply of claim 1, wherein the first inductance and the second inductance are wound about a common core.

12. A welding-type power supply having an output across first and second output lines, wherein the first and second output lines include an inductance for current that does not sum to zero through the first and second output lines having a magnitude of at least 60 times a differential magnitude of the inductance for current that sums to zero through the first and second output lines.

13. The welding-type power supply of claim 12, wherein the common mode inductance protects the welding-type power supply from high frequency noise on a workpiece.

14. The welding-type power supply of claim 13, further comprising at least first and second input power lines, wherein the first and second input lines includes a second common mode inductance.

15. The welding-type power supply of claim 14, further comprising capacitances connecting the first and second output lines to ground, wherein the common mode inductance and the capacitances protect the welding-type power supply from high frequency noise on a workpiece.

16. The welding-type power supply of claim 12, further comprising at least first and second input power lines, wherein the first and second input lines includes a second common mode inductance.

17. A welding-type power supply having an output with an inductance that protects the welding-type power supply from high frequency noise on a workpiece, wherein the inductance for current that does not sum to zero through the first and second cables has a magnitude of at least 100 times the magnitude of the inductance for current that sums to zero through the first and second cables.

18. The welding-type power supply of claim 17, further comprising an input with an input inductance that protects the welding-type power supply from high frequency noise on the input.

19. The welding-type power supply of claim 18, further comprising capacitances connecting the output to ground.

20. The welding-type power supply of claim 18, wherein a common mode magnitude of the inductance is at least 30 microhenrys, and a differential mode magnitude of the inductance is at most 1 microhenry.

* * * * *